United States Patent
Gislason (10) Patent No.: US 9,805,107 B2
(45) Date of Patent: Oct. 31, 2017

(54) SYSTEMS AND METHODS FOR DYNAMIC PARTITIONING IN A RELATIONAL DATABASE

(75) Inventor: Eyjólfur Gislason, Tórshavn (DK)

(73) Assignee: Telduráðgevin Sp/f, Faroe Islands (DK)

( * ) Notice: Subject to any disclaimer, the term of this patent is extended or adjusted under 35 U.S.C. 154(b) by 880 days.

(21) Appl. No.: 13/315,951

(22) Filed: Dec. 9, 2011

(65) Prior Publication Data

US 2013/0151521 A1    Jun. 13, 2013

(51) Int. Cl.
*G06F 17/30* (2006.01)
(52) U.S. Cl.
CPC .... *G06F 17/30584* (2013.01); *G06F 17/3071* (2013.01)
(58) Field of Classification Search
CPC .................................................. G06F 11/1438
USPC ......................................................... 707/737
See application file for complete search history.

(56) References Cited

U.S. PATENT DOCUMENTS

| | | | |
|---|---|---|---|
| 6,014,656 A * | 1/2000 | Hallmark et al. | |
| 6,965,891 B1 * | 11/2005 | Jakobsson et al. | 707/714 |
| 2006/0253429 A1 * | 11/2006 | Raghavan et al. | 707/3 |
| 2007/0043749 A1 * | 2/2007 | Gerber et al. | 707/101 |

OTHER PUBLICATIONS

Baer, Hermann, "Partitioning in Oracle Database 11g", Product information, Oracle Corporation, Redwood Shores, CA (USA), (Jun. 2007), 13 pgs.
"18.2.4. HASH Partitioning", [Online]. Retrieved from the Internet: <http://dev.mysql.com/doc/refman/5.5/en/partitioning-hash.html>, (Accessed Mar. 11, 2013), 3 pgs.
"Partitioning Enhancements in Oracle Database 11g Release 1", [Online]. Retrieved from the Internet: <URL: http://www.oracle-base.com/articles/11g/partitioning-enhancements-11gr1.php>, (Accessed Mar. 11, 2013), 13 pgs.

* cited by examiner

*Primary Examiner* — Mohammad S Rostami
*Assistant Examiner* — Courtney Harmon
(74) *Attorney, Agent, or Firm* — Schwegman Lundberg & Woessner, P.A.

(57) ABSTRACT

Systems and methods for dynamic partitioning in a relational database are described herein. A system can be configured to receive a data object definition statement to define a data object, where the data object definition statement associates an expression with the data object, and where the expression defines a correlation between an attribute of the data object and a prospective partition of the data object. The system can then receive a data manipulation statement to manipulate data in the data object, and in response to receiving the data manipulation statement, process the data manipulation statement, where processing includes initiating evaluation of the expression to identify a target partition based on the correlation between the attribute and the prospective partition.

18 Claims, 5 Drawing Sheets

```
tx_lines
┌─────────────────────────────────────────────────────────────────────────┐
│STORE_ID  PRODUCT_GROUP_ID  PRODUCT_ID  TX_YEAR  TX_MONTH  TX_DAY  AMOUNT│
│--------  ----------------  ----------  -------  --------  ------  ------│
│                                                                         │
│                                                                         │
└─────────────────────────────────────────────────────────────────────────┘
```

```
tx_s1_pg3
┌─────────────────────────────────────────────────────────────────────────┐
│STORE_ID  PRODUCT_GROUP_ID  PRODUCT_ID  TX_YEAR  TX_MONTH  TX_DAY  AMOUNT│
│--------  ----------------  ----------  -------  --------  ------  ------│
│       1                 3          15     2011         3      10   15.22│
└─────────────────────────────────────────────────────────────────────────┘
```

SYSTEMS AND METHODS FOR DYNAMIC PARTITIONING IN A RELATIONAL DATABASE

TECHNICAL FIELD

This application is generally related to database technologies and more particularly related to systems and methods for dynamic partitioning in a relational database.

BACKGROUND

In database management, the use of partitioned tables may improve performance and manageability of large tables. Prior art partitioning techniques include one dimensional range, list, and hash partitioning. In addition, prior art partitioning techniques include composite partitioning, which is a two level combination of the range, list, and hash portioning techniques. The main drawback of partitioning is the need for database administrator involvement in the management of partitioned tables and the administrative overhead that follows.

Creating and maintaining partitions in many modern database management system (DBMS) products is complex and cumbersome. What is needed is a streamlined mechanism to create and manage partitions in a database.

SUMMARY

In general, according to an embodiment, a command to create a table in a database is modified with parameters to create a corresponding partition scheme, where the partition scheme includes an expression. The expression is evaluated by the database management system to create the appropriate partitions in response to insert, update, or other commands that affect the contents of the created table. The command to create the table may also include a partition naming convention, which the database management system may use to reference existing partitions automatically or name new partitions when they are created.

Example 1 describes a system, method, or computer-readable medium for receiving and processing database commands, where a data object definition statement to define a data object is received at a computer-implemented database, where the data object definition statement associates an expression with the data object, and where the expression defines a correlation between an attribute of the data object and a prospective partition of the data object. A data manipulation statement to manipulate data in the data object is then received at the computer-implemented database. In response to receiving the data manipulation statement, the data manipulation statement is processed, where processing includes initiating evaluation of the expression to identify a target partition based on the correlation between the attribute and the prospective partition.

In Example 2, the system, method, or computer-readable medium of Example 1 can be optionally performed or configured such that evaluation of the expression comprises identifying a value of an attribute referenced by the data manipulation statement and using the value in the expression to identify the target partition for use in further processing the data manipulation statement.

In Example 3, the system, method, or computer-readable medium of any one or more of the Examples 1-2 can be optionally performed or configured such that the evaluation of the expression results in a value used to identify the target partition.

In Example 4, the system, method, or computer-readable medium of any one or more of the Examples 1-3 can be optionally performed or configured such that processing the data manipulation statement comprises identifying a value in the data manipulation statement and updating the target partition with the value.

In Example 5, the system, method, or computer-readable medium of any one or more of the Examples 1-4 can be optionally performed or configured such that processing the data manipulation statement comprises determining whether the target partition exists, and creating the target partition when the target partition does not exist.

In Example 6, the system, method, or computer-readable medium of any one or more of the Examples 1-5 can be optionally performed or configured such that the expression implements a naming convention to correlate a plurality of attributes of the data object with a name of the target partition.

In Example 7, the system, method, or computer-readable medium of any one or more of the Examples 1-6 can be optionally performed or configured such that the expression implements a naming convention to correlate one or more of attributes of the data object with a name of the target partition.

In Example 8, the system, method, or computer-readable medium of any one or more of the Examples 1-7 can be optionally performed or configured such that the expression is a column expression.

This summary is intended to provide an overview of certain subject matter of the present patent application. It is not intended to provide an exclusive or exhaustive explanation of the invention. The Detailed Description is included to provide further information about the subject matter of the present patent application.

BRIEF DESCRIPTION OF DRAWINGS

Embodiments are illustrated by way of example and not limitation in the figures of the accompanying drawings, in which like references indicate similar elements and in which.

In the following Detailed Description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

DETAILED DESCRIPTION

In a database, data is commonly arranged in tables, which are structured using rows and columns (e.g., attributes). Each row has attributes (or columns), which contain the values of the row. The values of a row in a table are also referred to as a "tuple." In the following disclosure, the term "attribute" may refer to a column in a defined data object, such as a table. Alternatively, the term "attribute" may refer to a column or field in a record (or tuple).

Overview

Figure 1:
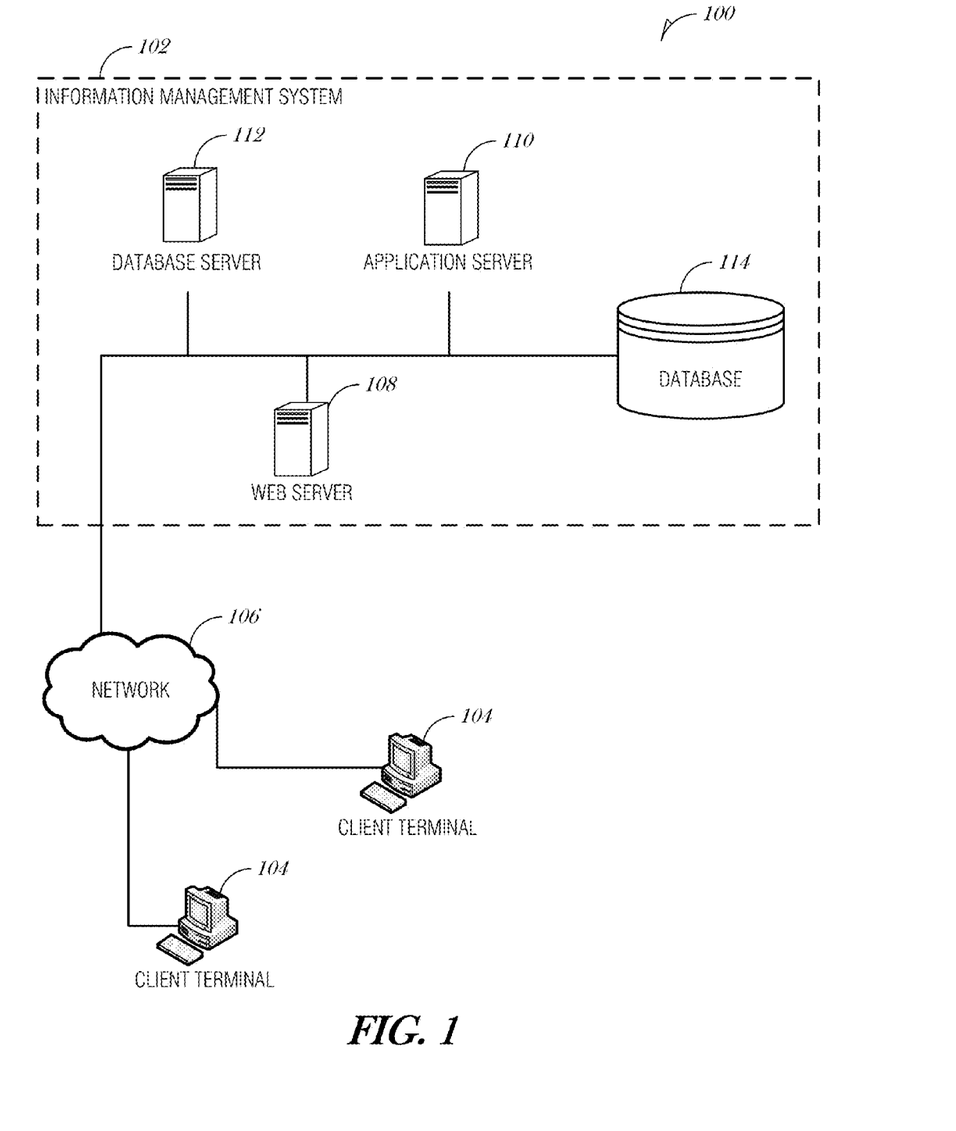
FIG. 1 is a schematic view illustrating a computer network system, in accordance with various embodiments.

FIG. 1 is a schematic view of a computer network system 100, according to various embodiments. The computer network system 100 includes an information management system 102 and a client terminal 104, communicatively coupled via a network 106. In an embodiment, the information management system 102 includes a web server 108, an application server 110, and a database server 112, which is used to manage at least a database 114. The information management system 102 may be implemented as a distributed system; for example, one or more elements of the information management system 102 may be located across a wide area network (WAN) from other elements of the information management system 102. A server (e.g., web server 108 or database server 112) may represent a group of two or more servers, cooperating with each other, provided by way of a pooled, distributed, or redundant computing model. In some embodiments, servers (e.g, web server 108, application server 110, or database server 112) may be combined, such that a single server provides the functionality of a web server and a database server, for example. In other embodiments, two or more servers may be used to provide the service depicted in FIG. 1. For example, multiple web servers 108 may be implemented for various design considerations, such as redundancy or load balancing.

A user may use client terminal 104 to access data stored at the database 114 using a query according to a standard database query language, such as the Structured Query Language (SQL). A user may also access the database 114 to create or destroy database objects, such as for example, tables, views, indexes, triggers, stored procedures, user accounts, roles, and the like. Examples of SQL statements include, but are not limited to, INSERT, SELECT, DELETE, UPDATE, CREATE TABLE, ALTER TABLE, and DROP TABLE. These SQL statements include required and optional arguments and parameters.

In various embodiments, when a SQL statement is received by a DBMS, the SQL statement is processed in a particular manner. First, the SQL statement is parsed to determine whether the statement is syntactically proper and whether the objects referenced exist in the database. Next, in a "bind phase," values are assigned to bind parameters embodied in the statement. For example, in a single record INSERT statement, the bind phase is where the value to be inserted into an attribute of a table is obtained. After the bind phase, the SQL statement is executed. When several records are referenced in the SQL statement, such as in a bulk insert or bulk update, the execute phase touches multiple records and for each record, a value is obtained for an attribute. If the SQL statement is a query, a result set is formed at the execute phase. If the SQL statement is to modify data or data structures, the data or data structures in the database are modified and a return code is produced.

Example Implementations

In this section, specific examples are provided to illustrate an exemplary implementation. These are not to be construed as limiting. While some of the computer code is presented using specific languages, it is understood that other programming languages or constructs may be used that achieve the same or similar result.

Figure 2A:
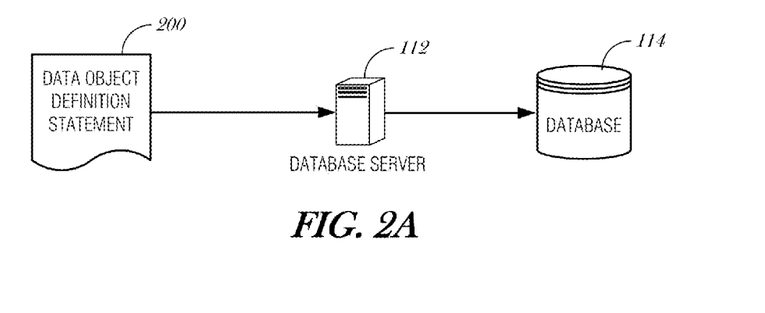
FIG. 2A is a schematic diagram illustrating an interaction with a database server, in accordance with various embodiments.

FIG. 2A is a schematic diagram illustrating an interaction with a database server 112, in accordance with various embodiments. A data object definition statement 200 is submitted to a database server 112, which will then interact with a database 114. In an embodiment, the data object definition statement 200 is a SQL statement that defines one or more objects in a database. In an embodiment, the data object definition statement 200 is from a class of statements known as Data Definition Language (DDL) Statements. Examples include statements that create an object, such as CREATE TABLE and CREATE INDEX. Examples of a data object definition statement 200 also include statements that alter or modify existing objects, such as ALTER TABLE and ALTER INDEX.

Figure 2B:
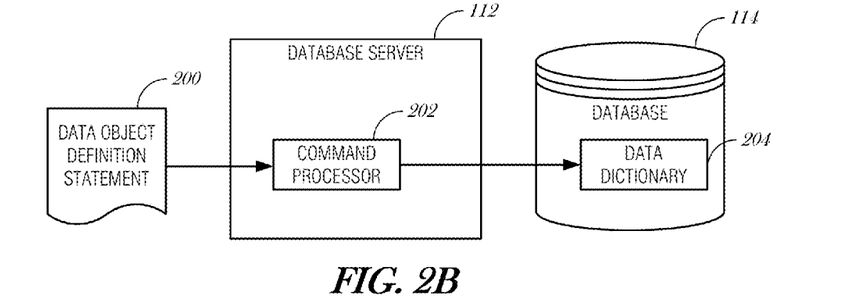
FIG. 2B is a schematic diagram illustrating an interaction with a database server in more detail, in accordance with various embodiments.

FIG. 2B is a schematic diagram illustrating an interaction with a database server 112 in more detail, in accordance with various embodiments. In particular, when a data object definition statement 200 is received at the database server 112, a command processor 202 is used to process the statement, as discussed above. If the statement is well formed and the binding phase is successful, the object targeted by the data object definition statement 200 is affected by modifying metadata in a data dictionary 204. A database's data dictionary is a part of a DBMS that stores information about the structures in the database. For example, the data dictionary includes information that describes the tables, indexes, views, triggers, and other objects.

In an example, the data object definition statement 200 may be:

```
CREATE TABLE tx_lines (
    store_id              integer,
    product_group_id      integer,
    product_id            integer,
    tx_year               integer,
    tx_month              integer,
    tx_day                integer,
    amount                real)
PARTITION BY EXPRESSION
'tx_s'|| store_id||'_pg'||product_group_id;
```

Figure 3:
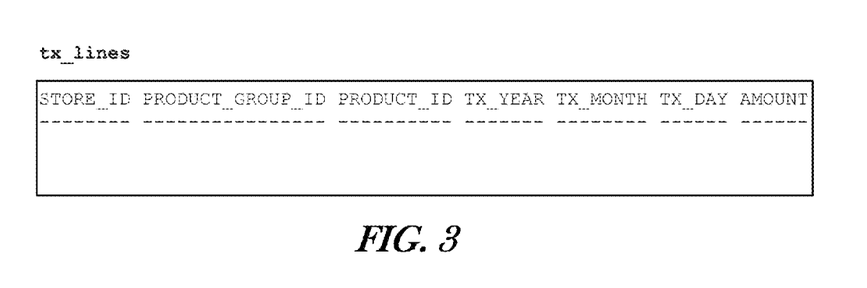
FIG. 3 is a table illustrating the contents of table "tx_lines" after creation, in accordance with various embodiments.

In the exemplary statement above, the table "Lx lines" is created with a PARTITION BY EXPRESSION clause. The resulting table of the CREATE TABLE statement is depicted in FIG. 3. The PARTITION BY EXPRESSION clause includes the expression 'tx_s'||store_id||'_pg'||product_group_id. This expression is evaluated when data is inserted into the table. Furthermore, the expression may be evaluated when data is modified or deleted from the table, depending on whether a column used in the expression is referenced in the modifying SQL statement. The expression returns a value, in this instance a character string, which the DBMS can use to identify the target partition. It is understood that other syntax may be used to provide an equivalent function. For example, the clause may be represented as dynamic partition on store_id, product_group_id name partitions using 'tx_s'||store_id||'_pg'||product_group_id. In this alternative, the "dynamic partition" portion of the clause includes the columns as arguments, and the "name partitions using" portion of the clause includes a variable string expression as the argument.

Figure 4A:
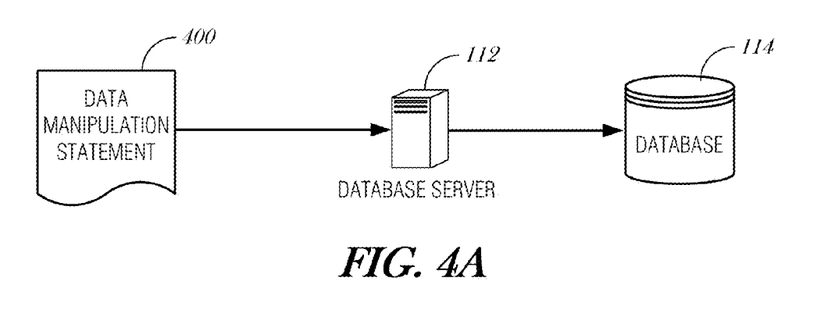
FIG. 4A is a schematic diagram illustrating an interaction with a database server, in accordance with various embodiments.

FIG. 4A is a schematic diagram illustrating an interaction with a database server 112, in accordance with various embodiments. A data manipulation statement 400 is submitted to a database server 112, which will then interact with a database 114. In an embodiment, the data manipulation statement 400 is a SQL statement that manipulates one or more objects in a database. In an embodiment, the data manipulation statement 400 is from a class of statements known as Data Manipulation Language (MIL) Statements. Examples include statements that modify data in an object, such as INSERT, DELETE, and UPDATE.

Figure 4B:
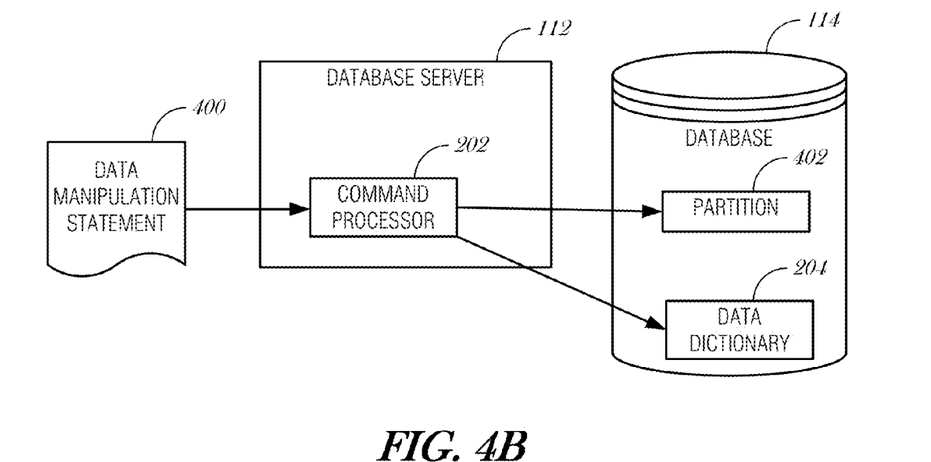
FIG. 4B is a schematic diagram illustrating an interaction with a database server in more detail, in accordance with various embodiments.

FIG. 4B is a schematic diagram illustrating an interaction with a database server 112 in more detail, in accordance with various embodiments. The data manipulation statement 400 may be processed by the database server 112, such as with a "parse phase," a "bind phase," and a "execute phase," as described above. Continuing the example from above, the data manipulation statement 400 may comprise an INSERT statement. For this example, the data manipulation statement 400 is:
INSERT INTO tx_lines VALUES (1, 3, 15, 2011, 3, 10, 15.22)

Figure 5:
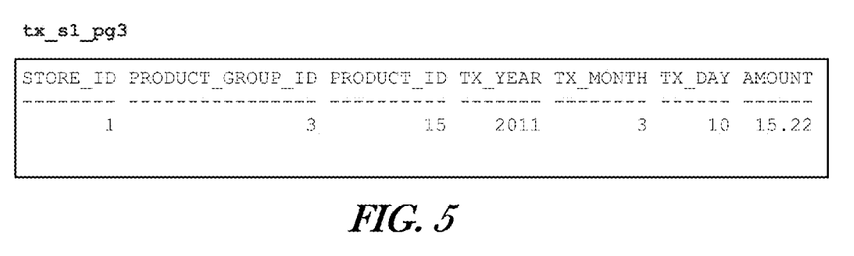
FIG. 5 is a table illustrating the contents of partition "tx_s1_pg3", accordance with various embodiments.

In the exemplary statement above, the values are inserted into table "tx_lines." The command processor 202 refers to the data dictionary 204 to determine that the table "tx_lines" has an associated PARTITION BY EXPRESSION clause. The command processor 202 accesses the expression to evaluate it. Here, the expression is 'tx_s'||store_id||'_pg'||product_group_id. Evaluating this expression, the command processor 202 substitutes the values from the INSERT command to derive the string "tx_s1_pg3". The command processor 202 determines whether the partition "tx_s1_pg3" already exists. If the partition does exist, then the command processor 202 inserts the data into the appropriate partition, such as the partition 402 illustrated in FIG. 4B. If the partition does not exist, the partition is created using the name "tx_s1_pg3" and the data is inserted into the newly created partition. FIG. 5 illustrates an exemplary resulting partition of the INSERT statement illustrated above.

When a partition is created, various low-level data manipulations are performed to support the partition. The partition is registered in the data dictionary 204 where it is associated with the parent table and with lower level storage structures.

Additional examples of PARTITION BY EXPRESSION clauses are illustrated below. The first example uses a single column (attribute) in a string expression and creates or uses partitions based on the product_id column.

```
CREATE TABLE tx_lines (
    store_id                integer,
    product_group_id        integer,
    product_id              integer,
    tx_year                 integer,
    tx_month                integer,
    tx_day                  integer,
    amount                  real)
PARTITION BY EXPRESSION 'tx_productid_'||product_id;
```

In this next example, one set of partitions is created or used when certain conditions are satisfied, and another set of partitions is used when the condition is not satisfied.

```
CREATE TABLE tx_lines (
    store_id                integer,
    product_group_id        integer,
    product_id              integer,
    tx_year                 integer,
    tx_month                integer,
    tx_day                  integer,
    amount                  real)
PARTITION BY EXPRESSION
    case when store_id < 50 and product_id BETWEEN 1 AND 100
        then 'tx_s'||store_id||'p_'||product_id
        else 'tx_p'|| product_id
    end;
```

In this next example, partition names are literal strings and a CASE statement is used to partition the "q1_sales_by_region" table based on the state abbreviation.

```
CREATE TABLE q1_sales_by_region (
    store_no number,
    store_name varchar2(20),
    quarterly_sales number(10, 2),
    state varchar2(2))
PARTITION BY EXPRESSION
    case
        when state in ('OR', 'WA') then 'q1_northwest'
        when state in ('AZ', 'UT', 'NM') then 'q1_southwest'
        when state in ('NY', 'VM', 'NJ') then 'q1_northeast'
        when state in ('FL', 'GA') then 'q1_southeast'
        when state in ('SD', 'WI') then 'q1_northcentral'
        when state in ('OK', 'TX') then 'q1_southcentral'
    end
```

As one variation of the previous example, the next example alters the table "q1_sales_by_region" to use partitions based on each state's abbreviation. The command, if implemented in the DBMS, physically relocates the table according to the new partitioning scheme.

```
ALTER TABLE q1_sales_by_region
PARTITION BY EXPRESSION 'q1_state_'||state
```

In this next example, partitions are created that represent gross sales revenue bracketed into buckets of 1,000 units (e.g., dollars) for each month.

```
CREATE TABLE sales (
    prod_id         NUMBER(6) NOT NULL,
    cust_id         NUMBER NOT NULL,
    time_id         DATE NOT NULL,
    channel_id      CHAR(1) NOT NULL,
    promo_id        NUMBER(6) NOT NULL,
    quantity_sold   NUMBER(3) NOT NULL,
    item_price      NUMBER(10,2) NOT NULL,
```

-continued

```
PARTITION BY EXPRESSION
    'sales_'||TO_CHAR(time_id,'YYYYMM')||
    '_bucket_'|| ROUND(quantity_sold * item_price,-3)
ENABLE ROW MOVEMENT
PARALLEL NOLOGGING;
```

PARTITION BY EXPRESSION expressions described in this disclosure are stored in the data dictionary as part of a table's metadata. No actual partitions are created until data is inserted into the table, at which point the expression is invoked to identify a target partition. The expression represents a mapping function that maps a (possibly yet to be inserted) row to a (possibly yet to be created) partition. In this way, the expression acts as a "miniature" program that can be invoked by the DBMS engine to identify a partition that is destined to hold a specific record.

This is in contrast to some partitioning mechanisms that require explicit definition of individual partitions in "create table" or "alter table" statements and where partitions generally are represented as a list of conditions paired with corresponding partitions. Record values are matched against the list of preexisting partition conditions, or in the case of "range partitioning," against a preexisting range.

Methods of Operation

Figure 6:
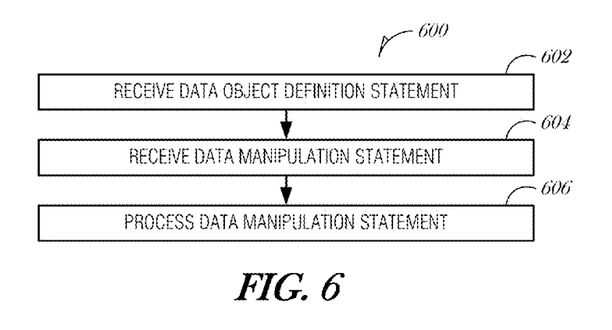
FIG. 6 is a flowchart illustrating a method of processing database object definition and manipulation statements, in accordance with various embodiments.

FIG. 6 is a flowchart illustrating a method 600 of processing database object definition and manipulation statements, in accordance with various embodiments. At block 602, a data object definition statement to define a data object is received. In an embodiment, the data object definition statement is received at a computer-implemented database. A data object definition statement comprises any statement that is used in a database to define a data object. Examples may include, but are not limited to, a CREATE TABLE statement or an ALTER TABLE statement. Data objects include, but are not limited to, tables, materialized views, and indexes. In an embodiment, the data object definition statement associates an expression with the data object, where the expression defines a correlation between an attribute of the data object and a prospective partition of the data object. In an embodiment, the expression is a PARTITION BY EXPRESSION clause, such as that described herein. In alternative embodiments, the expression is declared with different keywords or different syntax. It is understood that the partition expression may be represented in various ways within an object definition statement.

At block 604, a data manipulation statement to manipulate data in the data object is received. In an embodiment, the data manipulation statement is received at the computer-implemented database. A data manipulation statement comprises any statement that is used in a database to manipulate data. Examples may include, but are not limited to, an INSERT statement, an UPDATE statement, or a DELETE statement.

At block 606, in response to receiving the data manipulation statement, the data manipulation statement is processed. In an embodiment, processing includes initiating evaluation of the expression to identify a target partition based on the correlation between the attribute and the prospective partition.

In an embodiment, evaluation of the expression includes identifying a value of an attribute referenced by the data manipulation statement, and then using the value in the expression to identify the target partition for use in further processing the data manipulation statement.

In another embodiment, evaluation of the expression results in a value used to identify the target partition. In such an embodiment, the value may not be the name of the target partition, but rather an identifier or other hash value used to uniquely identify a target partition. One example is an internal object identifier used by a DBMS, which may not be readily visible to a user, but may be used by the DBMS to track partitions and other data objects.

In another embodiment, processing the data manipulation statement includes identifying a value in the data manipulation statement and updating the target partition with the value. For example, in an INSERT command, one or more values to be inserted are identified and the target partition is updated with the values.

In another embodiment, processing the data manipulation statement includes determining whether the target partition exists, and creating the target partition when the target partition does not exist.

In another embodiment, the expression implements a naming convention to correlate a plurality of attributes of the data object with a name of the target partition. Naming conventions are expressed in the PARTITION BY EXPRESSION clause and are discussed above with respect to FIGS. 4 and 5. In this embodiment, attributes are understood as referring to the fields in the data object, such as columns in a table. In an alternative embodiment, the expression implements a naming convention to correlate one or more attributes of the data object with a name of the partition. Thus, a single attribute may be used in a naming convention.

In another embodiment, the expression is a column expression. Column expressions are understood in the art to include expressions that contain columns of the subject table, constants, or deterministic functions (either SQL built-in functions or user-defined functions). Column expressions may be a simple expression, compound expression, function expression, or expression list. The combined components of a column expression must be deterministic. That is, the same set of input values must return the same set of output values.

Hardware and Software Platform

Figure 7:
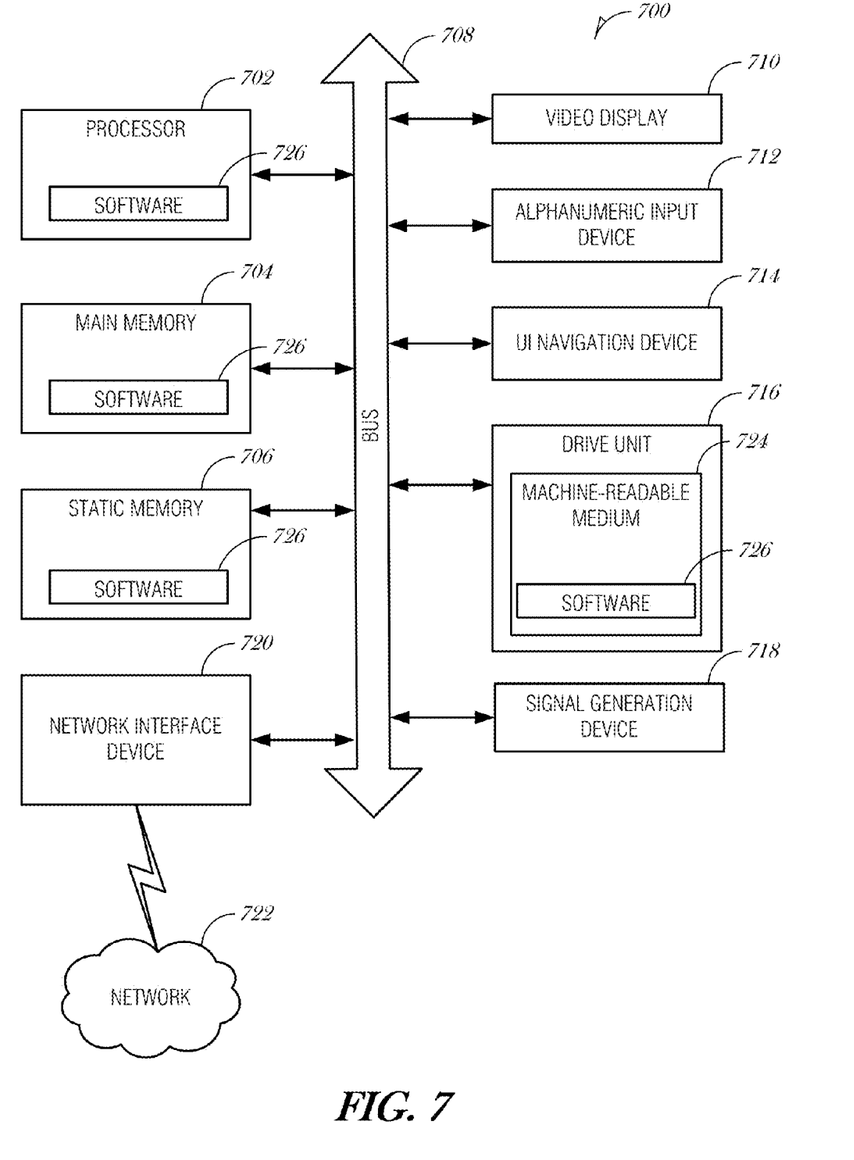
FIG. 7 is a block diagram illustrating a machine in the example form of a computer system, within which a set or sequence of instructions for causing the machine to perform any one of the methodologies discussed herein may be executed, according to various embodiments.

FIG. 7 is a block diagram illustrating a machine in the example form of a computer system 700, within which a set or sequence of instructions for causing the machine to perform any one of the methodologies discussed herein may be executed, according to various embodiments. In various embodiments, the machine may comprise a computer, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processor 702 (e.g., a central processing unit (CPU)), a main memory 704 and a static memory 706, which communicate via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface navigation device 714 (e.g., a mouse), a disk drive unit 716, a signal generation device 718 (e.g., a speaker) and a network interface device 720 to interface the computer system to a network 722.

The disk drive unit 716 includes a machine-readable storage medium 724 on which is stored a set of instructions or software 726 embodying any one, or all, of the methodologies described herein. The software 726 is also shown to reside, completely or at least partially, within the main memory 704, the static memory 706, and/or within the processor 702. The software 726 may further be transmitted or received via the network interface device 720.

While the computer system 700 is shown with a processor 702, it is understood that the systems and methods described herein can be implemented on one or more processors on one or more computer systems, including but not limited to a multi-processor computer (e.g., two or more separate processors or two or more cores in a single processor), a multi-computer system (e.g., a distributed computing environment), or a mixture of single-processor and multi-processor computers in a distributed fashion.

For the purposes of this specification, the term "machine-readable storage medium" or "computer-readable storage medium" shall be taken to include any tangible non-transitory medium which is capable of storing or encoding a sequence of instructions for execution by the machine and that cause the machine to perform any one of the methodologies described herein. Machine-readable and computer-readable storage mediums may be distinguished from machine-readable or computer-readable transmission mediums, which may be used to transmit instructions. The terms "machine-readable storage medium" or "computer-readable storage medium" shall accordingly be taken to include, but not be limited to, solid-state memories, and optical or magnetic disks. Further, it will be appreciated that the software could be distributed across multiple machines or storage media, which may include the machine-readable storage medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks (CDs) and digital video disks (DVDs)), magnetic cassettes, memory cards or sticks, random access memories (RAMs), read only memories (ROMs), and the like.

Such embodiments of the inventive subject matter may be referred to herein individually or collectively by the term "invention" merely for convenience and without intending voluntarily to limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Certain systems, apparatus, applications, or processes described herein may be implemented as a number of subsystems, modules, or mechanisms. A subsystem, module, or mechanism is a unit of distinct functionality that can provide information to, and receive information from, other subsystems, modules, or mechanisms. Further, such a unit may be configurable to process data. Accordingly, subsystems, modules, or mechanisms may be regarded as being communicatively coupled. The subsystems, modules, or mechanisms may be implemented as hardware circuitry, optical components, single or multi-processor circuits, memory circuits, software program modules and objects, firmware, and combinations thereof, as appropriate for particular implementations of various embodiments.

For example, one module may be implemented as multiple logical subsystems, modules, or mechanisms, or several subsystems, modules, or mechanisms may be implemented as a single logical subsystem, module, or mechanism. As another example, subsystems, modules, or mechanisms labeled as "first," "second," "third," and the like, may be implemented in a single subsystem, module, or mechanism, or some combination of subsystems, modules, or mechanisms, as would be understood by one of ordinary skill in the art.

In the foregoing Detailed Description, various features are grouped together in a single embodiment for streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate preferred embodiment.

The description includes references to the accompanying drawings, which form a part of the Detailed Description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

As used throughout this application, the word "may" is used in a permissive sense (e.g., meaning having the potential to), rather than the mandatory sense (e.g., meaning must). Similarly, the words "include", "including", and "includes" mean "including but not limited to." To facilitate understanding, like reference numerals have been used, where possible, to designate like elements common to the figures.

In the appended claims, the terms "including" and "in which" are used as the plain-English equivalents of the respective terms "comprising" and "wherein," Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and the like are used merely as labels, and are not intended to impose numerical requirements on their objects.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-based database management system comprising:
a processor; and
a memory coupled to the processor, the memory for storing instructions, which when executed by the processor, cause the processor to:
receive a data object definition statement to define a data object, wherein the data object definition statement associates an expression with the data object, wherein the expression defines a correlation between an attribute of the data object and a prospective partition of the data object, and wherein the expression does not include a literal identification of the prospective partition;
process the data object definition statement, wherein processing the data object definition statement includes storing the expression in a data dictionary;
receive a data manipulation statement to manipulate data in the data object; and
in response to receiving the data manipulation statement, process the data manipulation statement, wherein processing includes:
accessing the data dictionary to obtain the expression;
initiating evaluation of the expression to obtain a character value, wherein the evaluation of the expression is based on the attribute of the data object and results in the character value, which is an identification of the prospective partition;
identifying a target partition using the identification of the prospective partition; and
creating the target partition when the target partition does not already exist or modifying the target partition when the target partition does exist.

2. The system of claim 1, wherein the processor when evaluating the expression is further configured to:
identify a value of an attribute referenced by the data manipulation statement; and
use the value in the expression to identify the target partition for use in further processing of the data manipulation statement.

3. The system of claim 1, wherein the processor when processing the data manipulation statement is further configured to:
identify a value in the data manipulation statement; and
update the target partition with the value.

4. The system of claim 1, wherein the expression implements a naming convention to correlate a plurality of attributes of the data object with a name of the target partition.

5. The system of claim 4, wherein the character value is the name of the target partition.

6. The system of claim 1, wherein the expression is a column expression.

7. A method comprising:
receiving, at processor-based system implementing a computer-implemented database management system, a data object definition statement to define a data object, wherein the data object definition statement associates an expression with the data object, wherein the expression defines a correlation between an attribute of the data object and a prospective partition of the data object, and wherein the expression does not include a literal identification of the prospective partition;
processing the data object definition statement, wherein processing the data object definition statement includes storing the expression in a data dictionary;
receiving, at the computer-implemented database management system, a data manipulation statement to manipulate data in the data object; and
in response to receiving the data manipulation statement, processing the data manipulation statement by the processor-based system, wherein processing includes:
accessing the data dictionary to obtain the expression;
initiating evaluation of the expression to obtain a character value, wherein the evaluation of the expression is based on the attribute of the data object and results in the character value, which is an identification of the prospective partition;
identifying a target partition using the identification of the prospective partition; and
creating the target partition when the target partition does not already exist or modifying the target partition when the target partition does exist.

8. The method of claim 7, wherein evaluation of the expression comprises:
identifying a value of an attribute referenced by the data manipulation statement; and
using the value in the expression to identify the target partition for use in further processing of the data manipulation statement.

9. The method of claim 7, wherein processing the data manipulation statement comprises:
identifying a value in the data manipulation statement; and
updating the target partition with the value.

10. The method of claim 7, wherein the expression implements a naming convention to correlate a plurality of attributes of the data object with a name of the target partition.

11. The method of claim 10, wherein the character value is the name of the target partition.

12. The method of claim 7, wherein the expression is a column expression.

13. A machine-readable storage medium comprising instructions, which when executed by a machine, cause the machine to:
receive a data object definition statement to define a data object, wherein the data object definition statement associates an expression with the data object, wherein the expression defines a correlation between an attribute of the data object and a prospective partition of the data object, and wherein the expression does not include a literal identification of the prospective partition;
process the data object definition statement, wherein processing the data object definition statement includes storing the expression in a data dictionary;
receive a data manipulation statement to manipulate data in the data object; and in response to receiving the data manipulation statement, process the data manipulation statement, wherein the instructions to process the data manipulation statement include instructions that cause the machine to:
  access the data dictionary to obtain the expression;
  initiate evaluation of the expression to obtain a character value, wherein the evaluation of the expression is based on the attribute of the data object and results in the character value, which is an identification of the prospective partition;
  identify a target partition using the identification of the prospective partition; and
  create the target partition when the target partition does not already exist or modify the target partition when the target partition does exist.

14. The machine-readable storage medium of claim 13, wherein the instructions to evaluate of the expression comprise instruction to:
  identify a value of an attribute referenced by the data manipulation statement; and
  use the value in the expression to identify the target partition for use in further processing of the data manipulation statement.

15. The machine-readable storage medium of claim 13, wherein the instructions to process the data manipulation statement comprise instructions to:
  identify a value in the data manipulation statement; and
  update the target partition with the value.

16. The machine-readable storage medium of claim 13, wherein the expression implements a naming convention to correlate a plurality of attributes of the data object with a name of the target partition.

17. The machine-readable storage medium of claim 16, wherein the character value is the name of the target partition.

18. The machine-readable storage medium of claim 13, wherein the expression is a column expression.

* * * * *